Sept. 20, 1971  MASAKAZU MATSUMOTO  3,606,563
CENTERING DEVICE
Filed Feb. 10, 1969

MASAKAZU MATSUMOTO
INVENTOR.

BY Wenderoth, Lind & Ponack

Attorneys

United States Patent Office 3,606,563
Patented Sept. 20, 1971

3,606,563
CENTERING DEVICE
Masakazu Matsumoto, 1945 Ishikiri-machi,
Higashi-Osaka-shi, Osaka-fu, Japan
Filed Feb. 10, 1969, Ser. No. 797,983
Int. Cl. B23b 49/04, 43/02
U.S. Cl. 408—200
1 Claim

ABSTRACT OF THE DISCLOSURE

A centering device comprising a rotary center body rotatably mounting a center shaft, and a center drill mounting member removably connected to said rotary center body. The center drill mounting member is formed at one end with a bore for receiving therein said center shaft and mounting a collet at the other end thereof for holding a center drill on the extension of the center axis of said center shaft. This centering device permits to readily and quickly effect connection and disconnection of the center drill to and from the rotary center in effecting centering of a workpiece.

---

The present invention relates to a centering device which permits removably mounting a center drill on a rotary center and readily and quickly performing a workpiece centering operation.

Generally, in effecting cutting of an elongated workpiece, the workpiece should first be centered prior to the cutting operation in order to securely hold the workpiece in position.

In effecting centering and cutting of a workpiece, it has hitherto been customary to hold one end of the workpiece 3 by a rotary chuck 2 mounted on a table 2 of a lathe and then mount a drill chuck 5 on a tail stock 4 attached to said table 1 in a position in face to face relation with the other end of said workpiece 3 as shown in FIG. 1. The position of the tail stock 4 is adjusted so that the tail stock may be set in suitable position on the table 1. Then, centering of the workpiece 3 is effected while rotating the same, and a drill held by said drill chuck 5 is driven into the workpiece along the center axis thereof toward its center by operating a handle 6 mounted on said tail stock 4 in order to form a center hole along the center axis of the workpiece. After the center hole is formed as desired, the drill chuck 5 is moved rearwardly by operating the handle 6 to remove the drill chuck 5 from the tail stock 4 and a rotary center is mounted in place of the drill chuck. The rotary center is moved forwardly after the position of the tail stock 4 is adjusted again, so as to insert its center shaft in the center hole of the workpiece 3 to permit starting a cutting operation.

It will be evident that in the conventional device as aforementioned the drill chuck and the rotary center must be connected to and disconnected from the tail stock each time centering and cutting of a workpiece is effected. This exchange requires time and labor and results in an inevitable reduction in efficiency.

The present invention obviates this disadvantage of the conventional device. Accordingly, the invention has as its object the provision of a novel centering device which permits readily and quickly effecting connection and disconnection of a center drill to and from a rotary center and effect centering of a workpiece in a short time.

Additional objects and advantages of the invention will become apparent from the description set forth hereunder when considered in conjunction with the accompanying drawings, in which.

Figure 1:
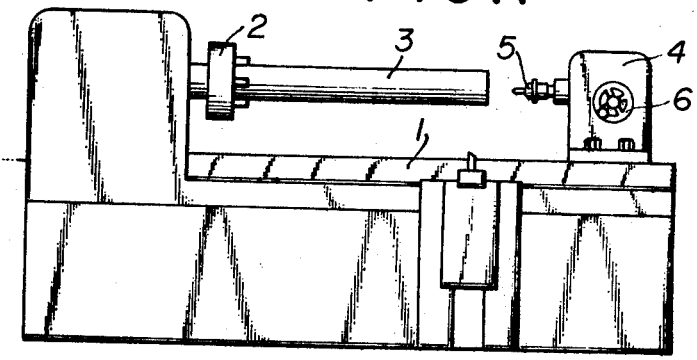
FIG. 1 is a schematic view for explanation of the manner in which centering of a workpiece is effected by a conventional device.
Figure 2:
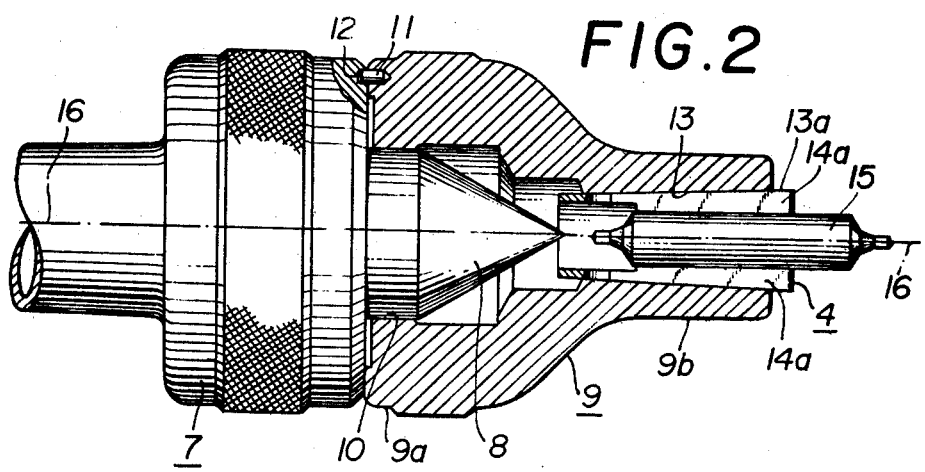
FIG. 2 is a longitudinal sectional side view of one embodiment of the device according to the present invention.

The invention will now be explained with reference to preferred embodiments thereof. Referring to FIG. 2, a rotary center body 7 is shown having a center shaft 8 rotatably mounted therein which is journalled in a bearing. A center drill holding member 9 substantially funnel-shaped in section has formed in its major diameter portion 9a a major diameter bore 10 for removably receiving therein the forward end of said center shaft 8. The center drill holding member 9 has at least one pin 11 fixedly mounted on and projecting from the end surface of its major diameter portion for engagement in a hole 12 formed in the end of the rotary center body 7 disposed in opposing relation with the end of the major diameter portion of the center drill holding member 9 so as to restrain the center drill holding member against rotation relative to the rotary center body.

The holding member 9 has formed in its minor diameter portion 9b a minor diameter bore 13 diverging outwardly and in communication with said major diameter bore 10. The minor diameter bore 13 is formed such that its center axis 16 is aligned with the center axis 16 of the center shaft 8. A cylindrical collet 14 for holding a drill which has an outwardly diverging body 13a complementary with the diverging minor diameter bore 13 and which is formed with a plurality of axially aligned slits 14a is removably fitted in the minor diameter bore 13.

A center drill 15 is positively held by the collet 14.

In a centering operation performed by using the centering device constructed as aforementioned, the rotary center body 7 is first connected to the tail stock 4 while the workpiece 3 is held by the rotary chuck 2 on the table 1 and the position of the tail stock 4 is adjusted so as to set the tail stock 4 in a suitable position. Then, the holding member 9 which holds the center drill 15 mounted on the outwardly diverging collet 14 inserted in the outwardly diverging minor diameter bore 13 is connected to rotary center body 7 by fitting the center shaft 8 of the latter in the major diameter bore 10. By rotating the workpiece 3 and simultaneously operating the handle 6 to move the holding member 9 forwardly with the rotary center as a unit, it is possible to form a center hole along the center axis of the workpiece 3.

After the center hole is formed as desired, the rotary center 7 is moved rearwardly together with the holding member 9 by operating the handle, 6 the holding member 9 is disconnected from the rotary center, and the rotary center alone is moved forwardly again so as to insert the forward end of the center shaft 8 into the center hole to start cutting of the workpiece.

From the foregoing description, it will be appreciated that the centering device according to this invention obviates the trouble of effecting exchange of a drill chuck and a rotary center each time centering of a workpiece is performed as is the case with a conventional centering device. According to the present invention, both the centering and cutting operations can be performed while the rotary center is mounted on the tail stock. Moreover, setting of the tail stock in a suitable position has only to be effected once. Thus, the present invention facilitates centering and cutting operations and greatly shortens the operation time. The center drill holding member 9 can be readily connected to and disconnected from the rotary center, and the centering device embodying this invention is very simple in construction.

Figure 3:
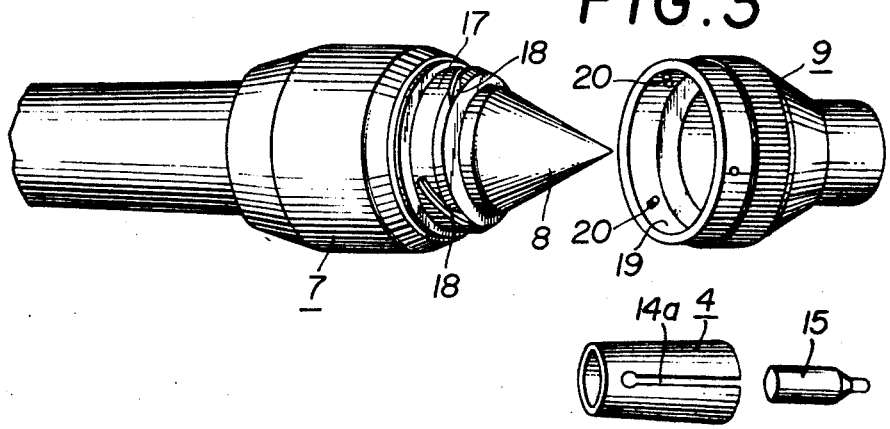
FIG. 3 is a perspective view, with certain parts being cut out, of another embodiment of the device according to this invention.

FIG. 3 shows another embodiment of the device according to this invention, in which a pin-and-groove connection is used for connecting the holding member 9 to the rotary center. The rotary center body 7 is formed with an offset portion 17 concentric with the rotary center body on the side thereof on which the center shaft 8 is mounted. The offset portion 17 has formed on its outer circumferential surface a plurality of grooves 18 spaced apart from one another an equal distance and extending obliquely from the outer end of the offset portion toward its inner end with respect to the center axis of the rotary center. The drill holding member 9 adapted to be connected to the rotary center 7 also has formed on the end of its major diameter bore 10 an offset portion 19 complementary with said offset portion 17 of the rotary center 7. A plurality of pins 20 spaced apart from one another an equal distance are mounted on the inner circumferential surface of the offset portion 19, so that if the pins 20 are received in the oblique grooves 18 and the drill holding member 9 and the rotary center 7 are rotated relative to each other, the former can be fitted over the latter.

The pin-and-groove connection of the second embodiment of this invention permits the drill holding member 9 and the rotary center to be held together more securely than the connection means of the first embodiment. Dislodging of the drill holding member 9 from the rotary center body 7 can be precluded, and formation of a center hole in a workpiece can be effected accurately and readily.

While the invention has been described above with reference to preferred embodiments thereof, it is to be understood that the invention is not limited to the specific details of the embodiments shown and described, and that many changes and modifications may be made therein without departing from the spirit of the invention.

I claim:

1. A centering device comprising a rotary center body having a center shaft with a pointed end portion and a cylindrical portion, said center shaft being rotatably mounted on said center body, said center body having an offset portion on the end toward which said pointed end portion of said shaft is mounted, said offset portion having a radial portion and an axially extending portion extending in the direction of said pointed end portion from said radial portion, said axially extending portion having a plurality of grooves therein extending obliquely and spaced at equal distances around the outer circumference of said axially extending portion, a center drill holding member having a major diameter portion having a hollow interior including a major diameter bore therein for snugly receiving the axially extending portion, a plurality of pins mounted on the inner circumferential surface of said major diameter portion, the number of said pins being equal in number to the number of said grooves and being spaced at equal distances around the outer circumference of said major diameter portion the same distance as said plurality of grooves are spaced, said center drill holding member further having a minor diameter portion with an outwardly diverging minor diameter bore with its center axis aligned with the center axis of said center shaft, a collet having a shape complementary to the outwardly diverging minor diameter bore of the center drill holding member in said minor diameter bore, and a center drill mounted in said collet, the length and taper of said pointed end portion being such that when the end of said center drill holding member is abutted against said radial portion, said tapered portion is spaced from the surface of said hollow interior of said center drill holding member and from the end of said collet and said center drill within said minor diameter portion, whereby when said pins are placed in said grooves and the center drill holding member is rotated relative to said rotary center body, said center drill holding member is moved axially onto the axially extending portion of said offset portion until the end of the center drill holding member abuts the radially extending portion of said offset portion.

References Cited
FOREIGN PATENTS
414,806   8/1934   Great Britain.

FRANCIS S. HUSAR, Primary Examiner

U.S. Cl. X.R.

408—75